US012683423B1

(12) United States Patent
Li

(10) Patent No.: US 12,683,423 B1
(45) Date of Patent: Jul. 14, 2026

(54) FAST CHARGING CIRCUIT FOR ADULT TOYS AND ADULT TOY

(71) Applicant: SINGAPORE JOYHUB TECH PTE. LTD., Singapore (SG)

(72) Inventor: Jun Li, Chengdu (CN)

(73) Assignee: SINGAPORE JOYHUB TECH PTE. LTD., Singapore (SG)

( * ) Notice: Subject to any disclaimer, the term of this patent is extended or adjusted under 35 U.S.C. 154(b) by 0 days.

(21) Appl. No.: 19/310,392

(22) Filed: Aug. 26, 2025

(30) Foreign Application Priority Data

Aug. 7, 2025 (CN) .......................... 202511105680.8

(51) Int. Cl.
*H02J 7/96* (2026.01)
*H02J 7/65* (2026.01)
*A61H 19/00* (2006.01)

(52) U.S. Cl.
CPC .................. *H02J 7/96* (2026.01); *H02J 7/65* (2026.01); *A61H 19/00* (2013.01); *A61H 2201/5097* (2013.01)

(58) Field of Classification Search
CPC ............ H02J 7/007182; H02J 7/00309; A61H 19/00; A61H 2201/5097
See application file for complete search history.

(56) References Cited

U.S. PATENT DOCUMENTS

| | | | | | |
|---|---|---|---|---|---|
| 2008/0136396 A1* | 6/2008 | Heilmann | ................. | G05F 1/56 | |
| | | | | 323/298 | |
| 2011/0140673 A1* | 6/2011 | Zhang | ....................... | H02J 7/61 | |
| | | | | 320/145 | |

| | | | | | |
|---|---|---|---|---|---|
| 2014/0148740 A1* | 5/2014 | Howsam | ................ | A61H 23/00 | |
| | | | | 206/524.1 | |
| 2021/0359538 A1* | 11/2021 | Huang | ....................... | H02J 7/04 | |
| 2022/0311259 A1* | 9/2022 | Kudo | .................. | H02J 7/00308 | |
| 2023/0120942 A1* | 4/2023 | Yen | ....................... | H02J 7/00714 | |
| | | | | 429/7 | |
| 2024/0348161 A1* | 10/2024 | Lu | ........................... | H02M 3/07 | |

FOREIGN PATENT DOCUMENTS

| | | |
|---|---|---|
| CN | 104269902 A | 1/2015 |
| CN | 206807066 U | 12/2017 |
| CN | 111106818 A | 5/2020 |
| CN | 212183153 U | 12/2020 |
| CN | 212849953 U | 3/2021 |

* cited by examiner

*Primary Examiner* — Drew A Dunn
*Assistant Examiner* — Pamela J Jeppson
(74) *Attorney, Agent, or Firm* — Ming Jiang; OPENPTO US LLC

(57) ABSTRACT

A fast charging circuit for adult toys includes a charging control unit, where the charging control unit is configured to perform charging control of a rechargeable battery with a charging rate of not less than 1 C, and the charging control unit employs a battery fast-charging management chip. A constant current parameter setting loop is disposed at a current control terminal of the battery fast-charging management chip and configured to switch and/or set current parameters for a constant current charging process. An enable control loop is disposed at an enable terminal of the battery fast-charging management chip. In this way, the present disclosure achieves precise control of charging current, and greatly shortens the charging duration, such that the user does not need to wait for completion of an entire charging process or a long charging duration, but may charge the adult toy in fragmented time.

15 Claims, 6 Drawing Sheets

FAST CHARGING CIRCUIT FOR ADULT TOYS AND ADULT TOY

CROSS REFERENCE TO RELATED APPLICATIONS

The present application claims priorities of Chinese Patent Application No. 2025111056808, filed on Aug. 7, 2025, the contents of which are hereby incorporated by reference in entirety.

TECHNICAL FIELD

The present disclosure belongs to the technical field of charging control, and relates to a fast charging circuit for adult toys and an adult toy.

BACKGROUND

As important carriers that meet individual physiological and emotional needs, adult toys have shown a development trend of diversification driven by technological iteration and consumption upgrading in recent years. In product forms, single physical stimulation tools such as basic massage wands, egg-shaped vibrators, and intelligent silicone dolls, have evolved into intelligent devices integrating technologies of biosensing, temperature control simulation, remote control, and the like. Moreover, there are various designs for products of the same type.

However, currently there still exists a common efficiency bottleneck in the technical field of charging adult toys. A solution of slow charging at 5V/1 A is usually adopted for mainstream products, and a charging duration generally ranges from 1.5 h to 3 h.

It is found through research that the slow charging design for currently available adult toys has become a key pain point restricting user experience. Due to depletion of battery power of an adult toy, the user usually falls into a passive state when using the adult toy at a critical node of emotional heating. Under the mainstream slow charging solution, 1-2 h is generally needed to restore basic battery life required to support a single use of the adult toy, which is far beyond the user's expectation for instant experience. The time difference directly causes the user to miss the best opportunity to use the adult toy, and the sense of expectation gradually fades during the waiting process. What's worse, repeated "power shortages" may even reduce the user's dependence on the product.

SUMMARY

In order to solve the technical problems existing in the prior art, the present disclosure provides a fast charging circuit for adult toys and an adult toy.

In order to achieve the above objective, the present disclosure provides a technical solution as follows:

In a first aspect, the present disclosure provides a fast charging circuit for adult toys, including a charging control unit, where the charging control unit is configured to perform charging control of a rechargeable battery with a charging rate of not less than 1 C, and the charging control unit employs a battery fast-charging management chip; a constant current parameter setting loop is disposed at a current control terminal of the battery fast-charging management chip and configured to switch and/or set current parameters for a constant current charging process; and an enable control loop is disposed at an enable terminal of the battery fast-charging management chip.

Optionally, the enable control loop includes a first comparison input terminal and a first control strategy; the first comparison input terminal is provided with a first comparator that takes an input voltage of a VCC terminal of the battery fast-charging management chip as a reference, and a voltage reference threshold of the first comparator is V1; and the first control strategy is that when VCC is greater than V1, an output of the first comparator causes the enable terminal to receive a low-level input.

Optionally, the voltage reference threshold V1 ranges from 4.2 V to 4.5 V.

Optionally, the first comparator is a hysteresis comparator; the voltage reference threshold V1 includes a first voltage reference threshold V11 and a second voltage reference threshold V12; the first voltage reference threshold V11 is greater than the second voltage reference threshold V12; and the first control strategy is specifically that when VCC is greater than V11, an output of the first comparator causes the enable terminal to receive a low-level input.

Optionally, a difference between the first voltage reference threshold V11 and the second voltage reference threshold V12 is a hysteresis voltage; and a value of the hysteresis voltage is greater than or equal to 0.1V.

Optionally, the constant current parameter setting loop includes at least two sets of switchable preset parameters.

Optionally, the constant current parameter setting loop is provided with a variable resistor; and the current parameters for the constant current charging process are switched by switching a resistance value of the variable resistor.

Optionally, the constant current parameter setting loop further includes a second comparison input terminal and a second control strategy; the second comparison input terminal is provided with a second comparator that takes an input voltage of the VCC terminal of the battery fast-charging management chip as a reference, and a voltage reference threshold of the second comparator is V2; the second control strategy is that when VCC is greater than V2, an output of the second comparator causes the variable resistor to switch to a first resistance value, and when VCC is less than V2, the output of the second comparator causes the variable resistor to switch to a second resistance value; and the first resistance value is less than the second resistance value.

Optionally, the constant current parameter setting loop is further provided with an electronic switch circuit; and the electronic switch circuit is disposed at an output terminal of the second comparator and configured to switch a resistance value of the variable resistor.

Optionally, a resistance value of the first resistor is less than $0.08\Omega$; and a resistance value of the second resistor is greater than $0.08\Omega$.

Optionally, the constant current parameter setting loop further includes a multi-level comparator detection module; and the multi-level comparator detection module is configured to construct a dual-threshold detection so as to switch the variable resistor among three resistance values.

Optionally, the multi-level comparator detection module includes a third comparison input terminal, a fourth comparison input terminal, and a third control strategy; the third comparison input terminal is provided with a third comparator that takes the input voltage of the VCC terminal of the battery fast-charging management chip as a reference, and a voltage reference threshold of the third comparator is V3; the fourth comparison input terminal is provided with a fourth comparator that takes the input voltage of the VCC terminal of the battery fast-charging management chip as a reference, and a voltage reference threshold of the fourth comparator is V4; V3 is greater than V4; the third control strategy is that when VCC is greater than V3 and VCC is greater than V4, an output causes the variable resistor to switch to a third resistance value; when VCC is less than V3 and VCC is greater than V4, an output causes the variable resistor to switch to a fourth resistance value; when VCC is less than V3 and VCC is less than V4, an output causes the variable resistor to switch to a fifth resistance value; and the third resistance value is less than the fourth resistance value, and the fourth resistance value is less than the fifth resistance value.

Optionally, the constant current parameter setting loop includes a resistor Rs; and the current parameters for the constant current charging process are set by setting different resistance values of the resistor Rs.

Optionally, the resistance value of the resistor Rs is any one of 0.5Ω, 0.1Ω, 0.05Ω, 0.033Ω, 0.025Ω, and 0.02Ω.

Optionally, an inductor L1 is disposed at the current control terminal of the battery fast-charging management chip, and the inductor L1 is further connected to the resistor Rs.

Optionally, a capacitor C1 is disposed at the current detection terminal of the battery fast-charging management chip; the capacitor C1 is connected between the current detection terminal of the battery fast-charging management chip and a first node; and the first node is located between the inductor L1 and the resistor Rs.

Optionally, a capacitor C2 is disposed at a voltage detection terminal of the battery fast-charging management chip; the capacitor C2 is connected between the voltage detection terminal of the battery fast-charging management chip and a second node; and the second node is located between the resistor Rs and a positive electrode of the rechargeable battery.

Optionally, a protection resistor and a filter capacitor are further disposed at the VCC terminal of the battery fast-charging management chip.

In a second aspect, the present disclosure provides an adult toy, including the fast charging circuit for adult toys as described in the first aspect.

Optionally, the adult toy further includes at least one charging cable for fast charging.

The present disclosure has the following beneficial effects: The fast charging circuit for adult toys provided by the present disclosure offers a fast charging option for adult toys, and the present disclosure switches and/or sets the current parameters for the constant current charging process through optimization of the battery fast-charging management chip combined with the constant current parameter setting loop, achieves precise control of charging current, and greatly shortens the charging duration, such that the user does not need to wait for completion of an entire charging process or a long charging duration, but may charge the adult toy in fragmented time. Moreover, the enable control loop enables to control activation and dormancy of the battery fast-charging management chip, and ensures the use safety and reliability of the adult toy with a fast charging function.

4

Figure 2:
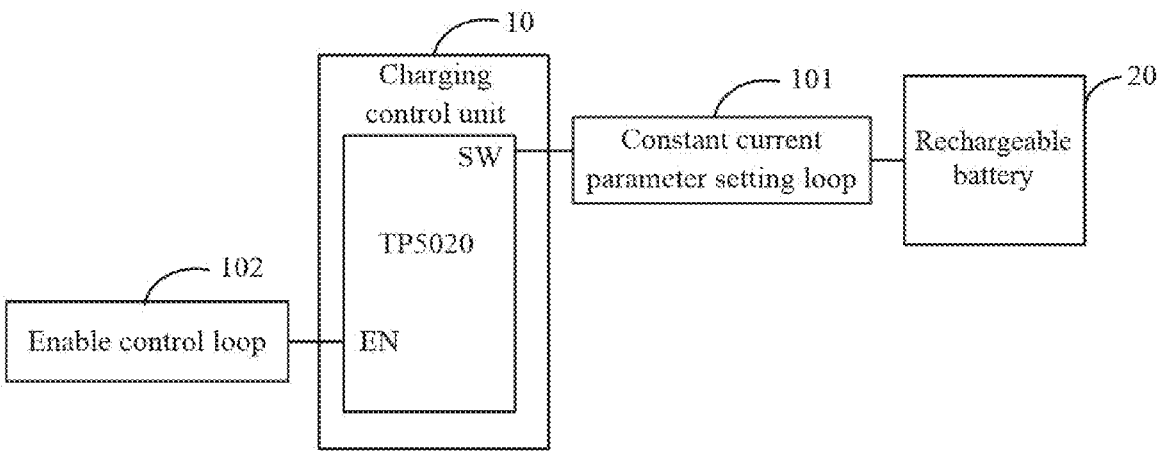

FIG. 2 is a module block diagram of a second fast charging circuit for adult toys provided in an embodiment of the present disclosure.

Figure 3:
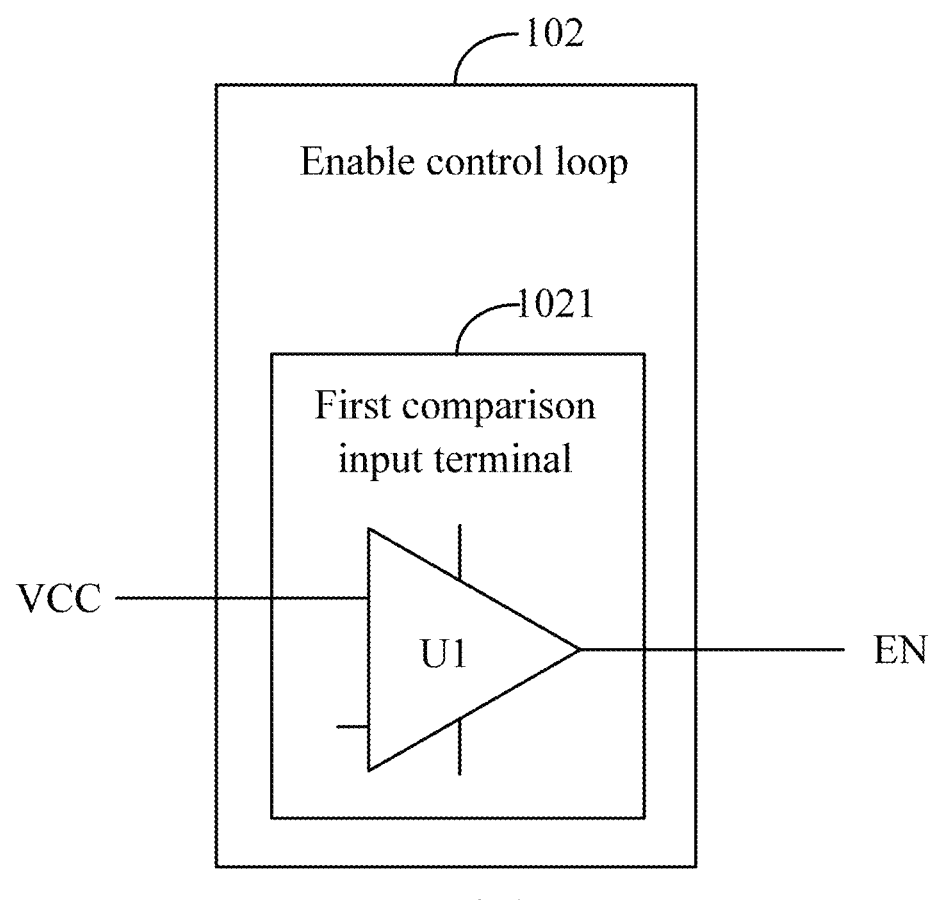

FIG. 3 is a module block diagram of a third fast charging circuit for adult toys provided in an embodiment of the present disclosure.

Figure 4:
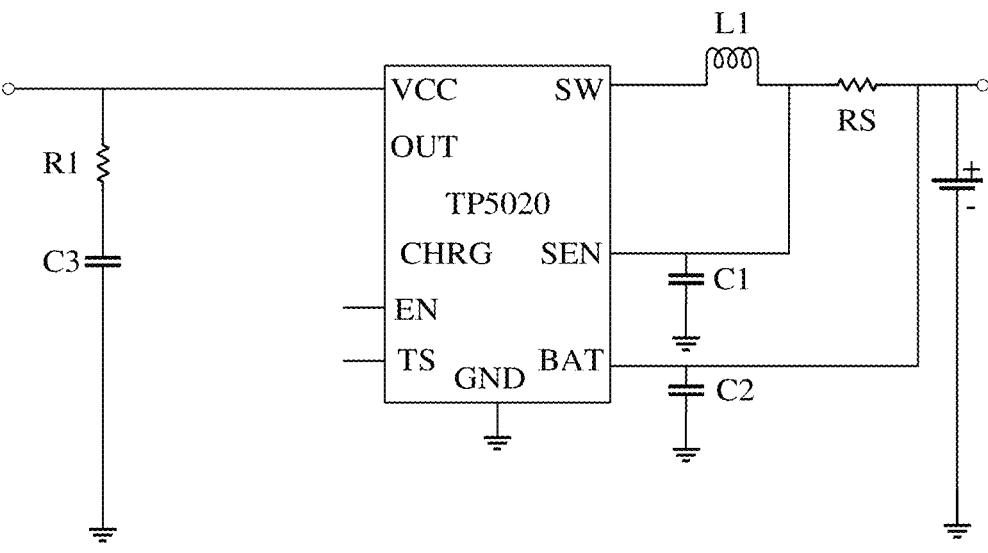

FIG. 4 is a circuit schematic diagram of a first fast charging circuit for adult toys provided in an embodiment of the present disclosure.

Figure 5:
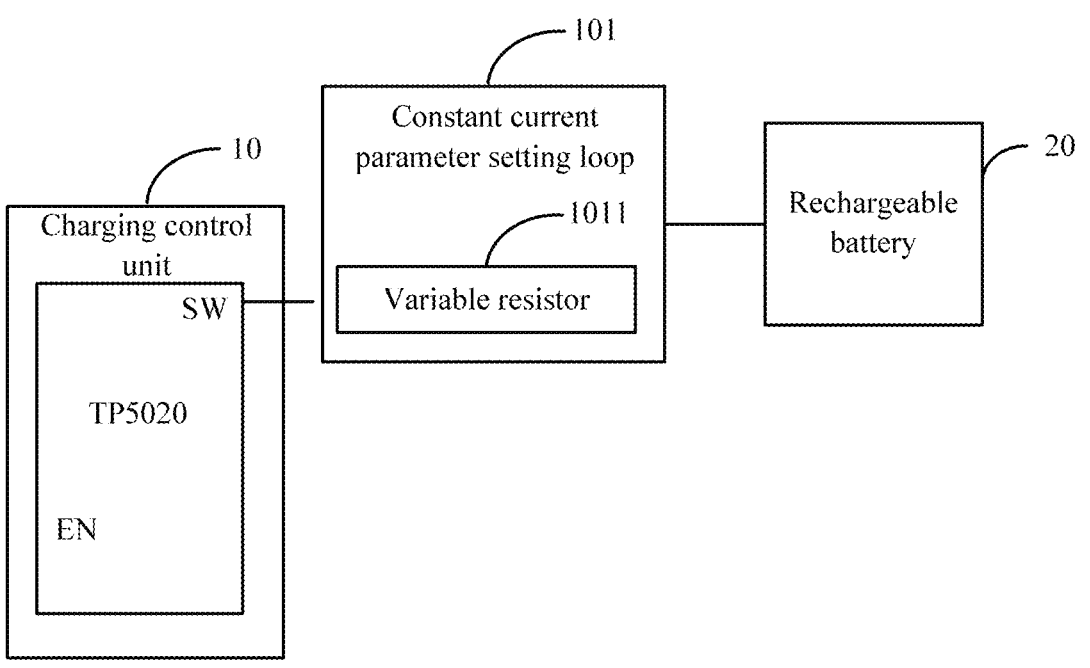

FIG. 5 is a module block diagram of a fourth fast charging circuit for adult toys provided in an embodiment of the present disclosure.

Figure 6:
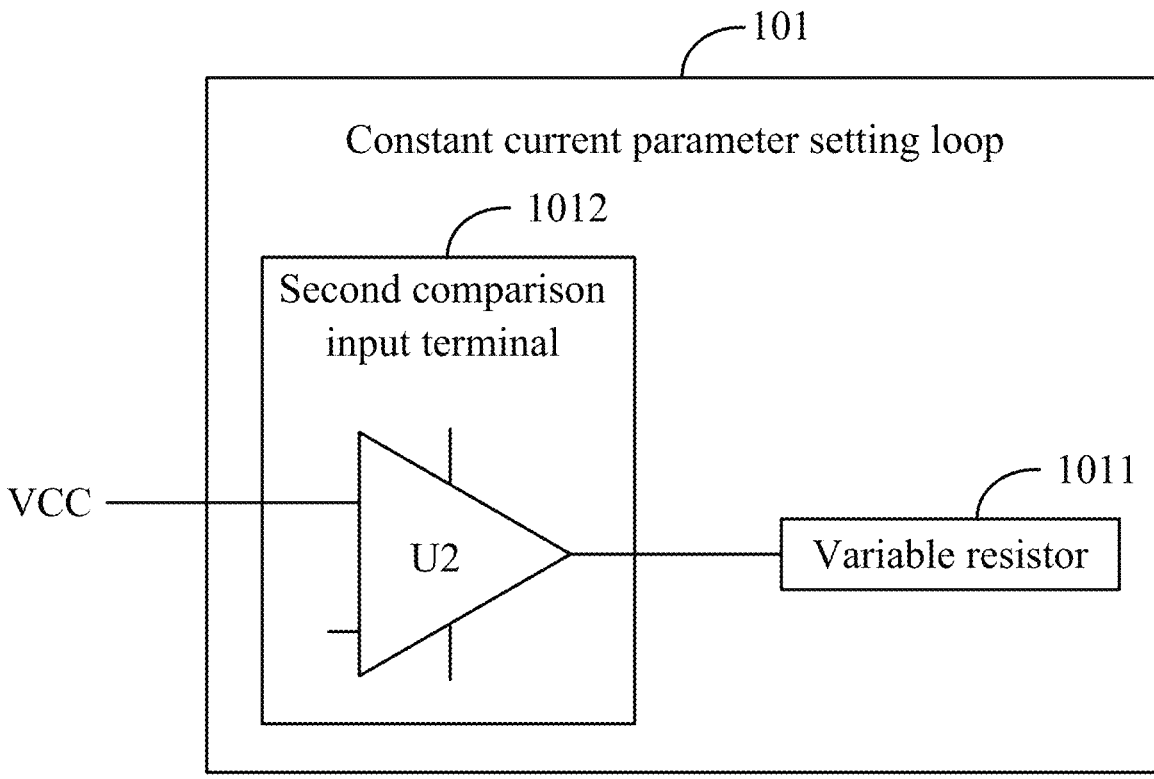

FIG. 6 is a module block diagram of a first constant current parameter setting loop provided in an embodiment of the present disclosure.

Figure 7:
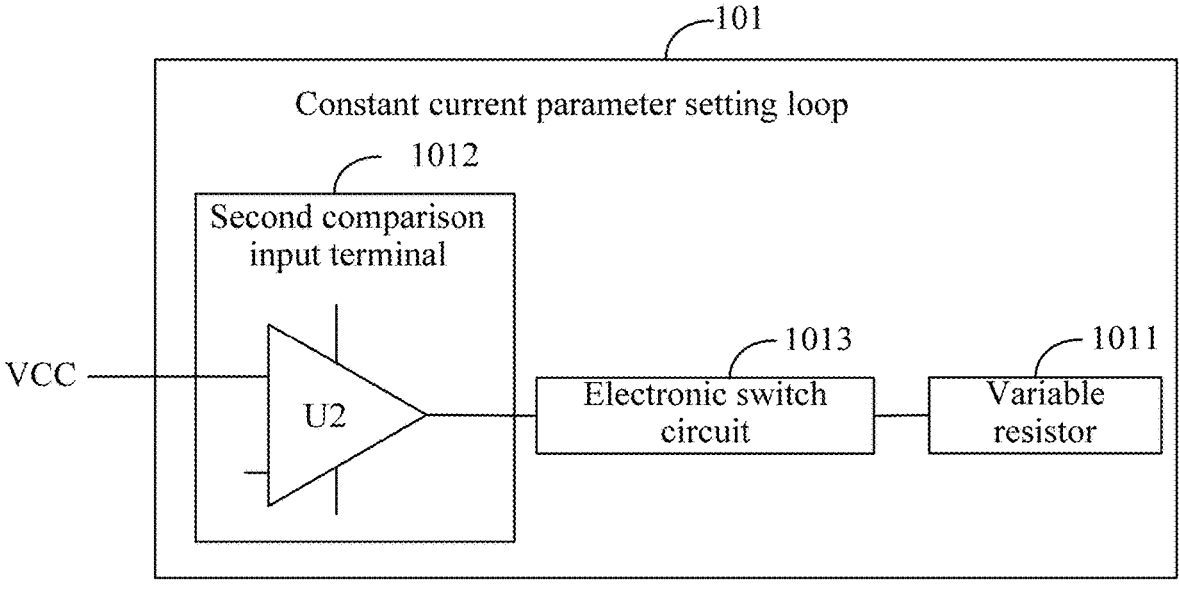

FIG. 7 is a module block diagram of a second constant current parameter setting loop provided in an embodiment of the present disclosure.

Figure 8:
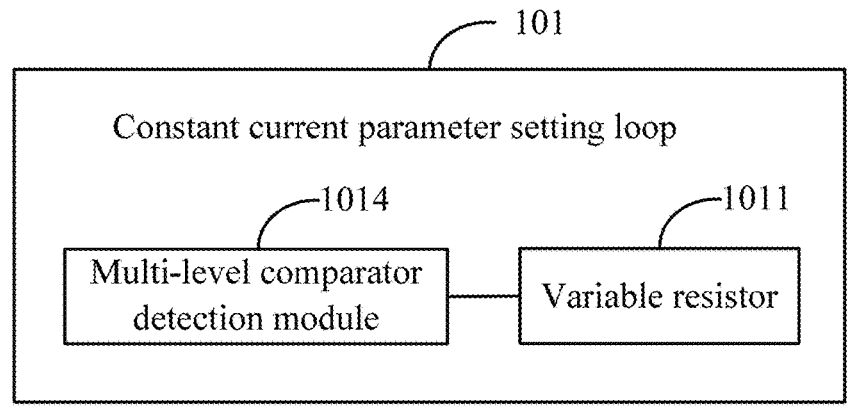

FIG. 8 is a module block diagram of a third constant current parameter setting loop provided in an embodiment of the present disclosure.

Figure 9:
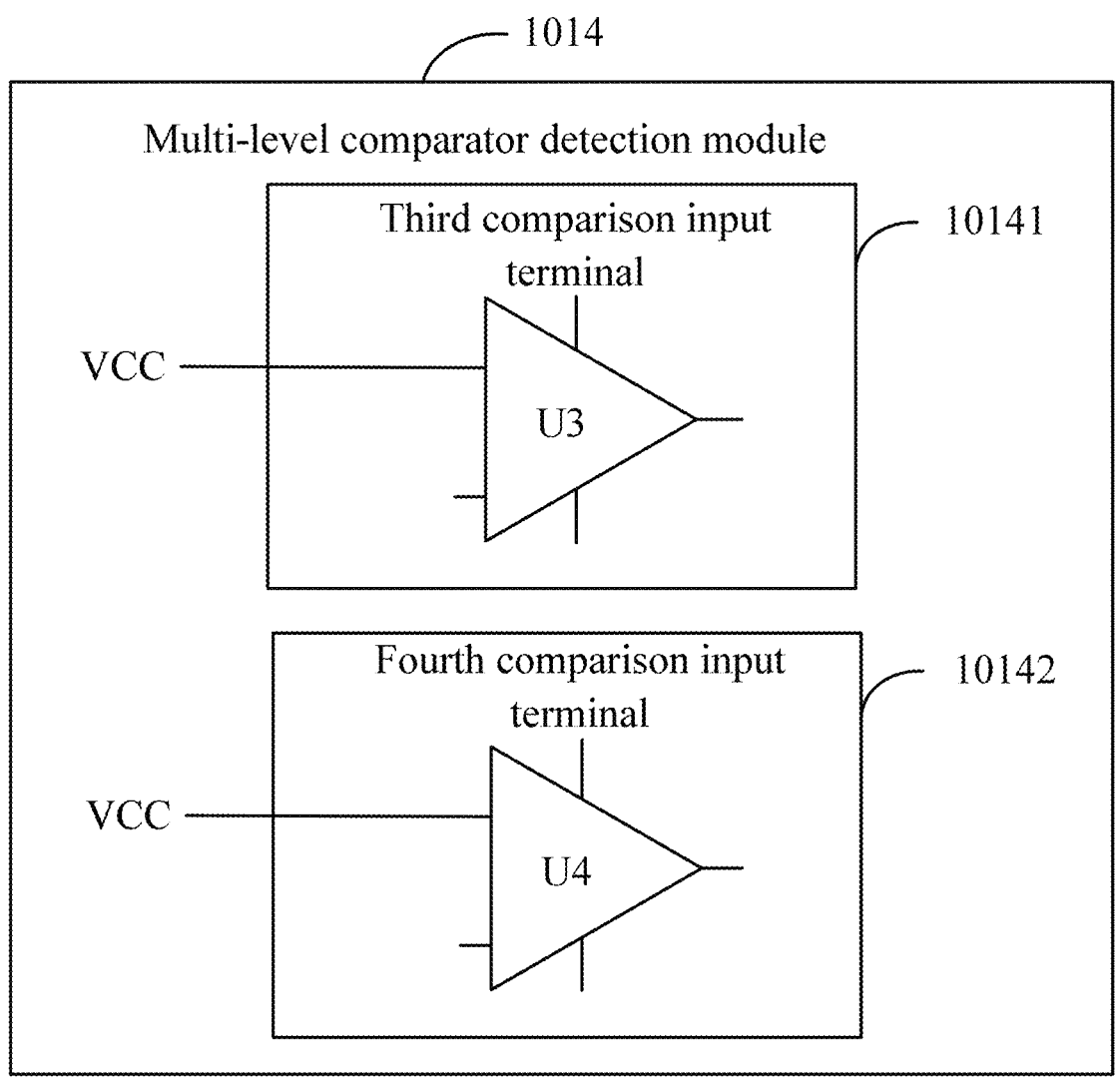

FIG. 9 is a module block diagram of a fourth constant current parameter setting loop provided in an embodiment of the present disclosure.

Figure 10:
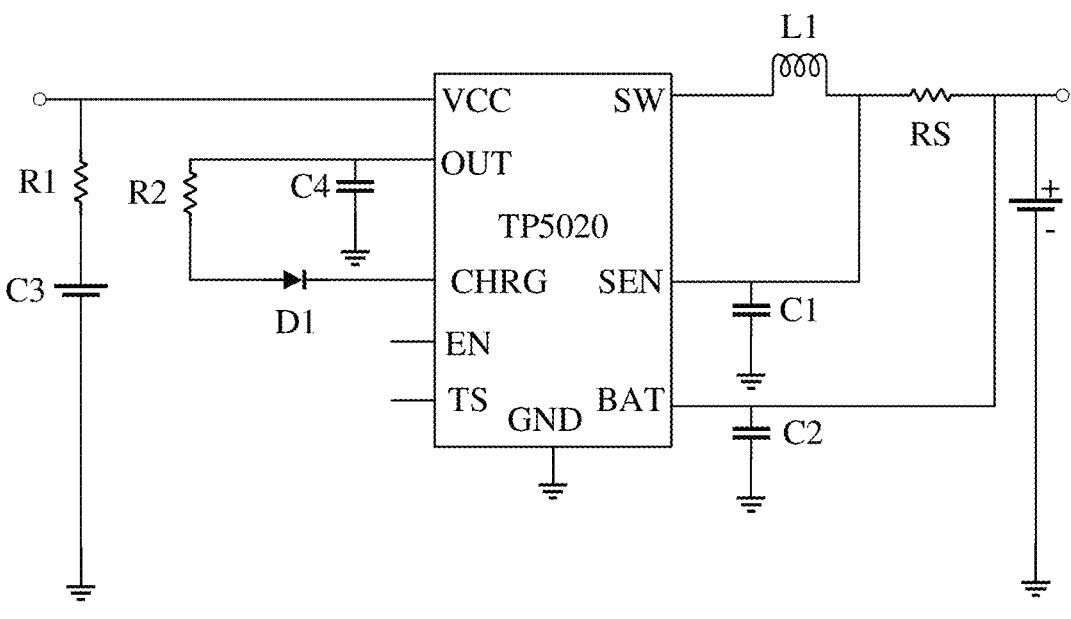

FIG. 10 is a circuit schematic diagram of a second fast charging circuit for adult toys provided in an embodiment of the present disclosure.

REFERENCE NUMERALS IN FIGURES

100—fast charging circuit for adult toys; 10—charging control unit; 101—constant current parameter setting loop; 1011—variable resistor; 1012—second comparison input terminal; 1013—electronic switch circuit; 1014—multi-level comparator detection module; 10141—third comparison input terminal; 10142—fourth comparison input terminal; 102—enable control loop; 1021—first comparison input terminal; and 20—rechargeable battery.

DETAILED DESCRIPTIONS OF THE EMBODIMENTS

The technical solutions in the embodiments of the present disclosure will be clearly and completely described below in combination with the accompanying drawings in the embodiments of the present disclosure. Apparently, the embodiments described are merely some rather than all of the embodiments of the present disclosure. Based on the embodiments of the present disclosure, all other embodiments obtained by those of ordinary skill in the art without making creative efforts shall fall within the protection scope of the present disclosure.

It is found by the applicant through research that the slow charging design for currently available adult toys has become a key pain point restricting user experience. Due to depletion of battery power of an adult toy, the user usually falls into a passive state when using the adult toy at a critical node of emotional heating. Under the mainstream slow charging solution, 1-2 h is generally needed to restore basic battery life required to support a single use of the adult toy, which is far beyond the user's expectation for instant experience. The time difference directly causes the user to miss the best opportunity to use the adult toy, and the sense of expectation gradually fades during the waiting process. What's worse, repeated "power shortages" may even reduce the user's dependence on the product.

In view of the above problems, the present disclosure provides the following embodiments to solve.

Figure 1:
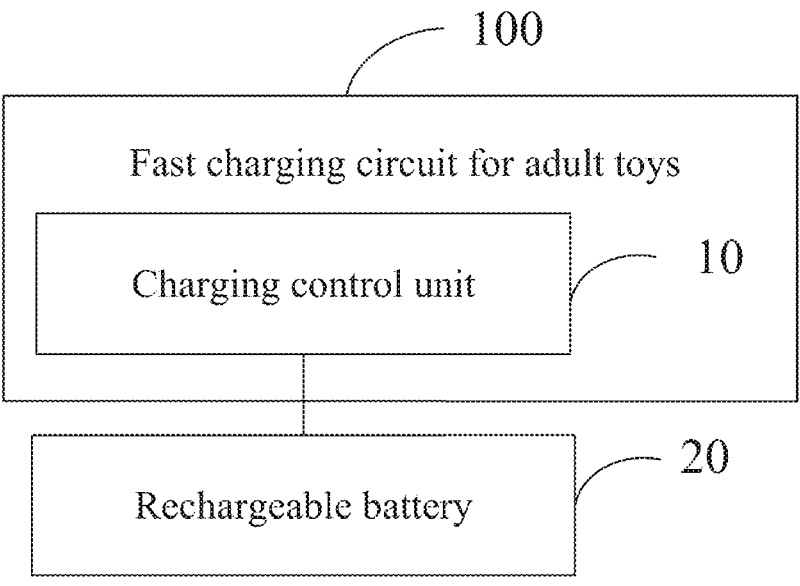
FIG. 1 is a module block diagram of a first fast charging circuit for adult toys provided in an embodiment of the present disclosure.

With reference to FIG. 1, in an embodiment of the present disclosure, a fast charging circuit 100 for adult toys is provided, including a charging control unit 10, where the charging control unit 10 is configured to perform charging control of a rechargeable battery 20 with a charging rate of not less than 1 C.

It should be noted that C is a rate unit of battery capacity, and for a 500 mAh battery, "not less than 1 C" means a charging current ≥500 mA; and for a 1000 mAh battery, "not less than 1 C" means a charging current ≥1000 mA. The definition of the rechargeable battery 20 with a charging rate of not less than 1 C in an embodiment of the present disclosure indicates that the battery may be fully charged in 1 h in theory, that is, the battery has the fast charging capability.

In an embodiment of the present disclosure, the charging control unit 10 employs a battery fast-charging management chip.

The battery fast-charging management chip may be a TP5020 battery fast-charging management chip, or the battery fast-charging management chip may be a TP5290 battery fast-charging management chip. Notably, other models of chips may also be employed, which are not listed in the present disclosure.

In the following embodiments of the present disclosure, the battery fast-charging management chip is mainly exemplified by using the TP5020 battery fast-charging management chip.

Specifically, with reference to FIG. 2, the charging control unit 10 employs the TP5020 battery fast-charging management chip.

The TP5020 battery fast-charging management chip serves as a charging control chip of the fast charging circuit 100 for adult toys provided in an embodiment of the present disclosure.

A constant current parameter setting loop 101 is disposed at a current control terminal of the TP5020 battery fast-charging management chip and configured to switch and/or set current parameters for a constant current charging process.

The current control terminal of the TP5020 battery fast-charging management chip is an SW terminal shown in FIG. 2. When the TP5290 battery fast-charging management chip is employed, the current control terminal is specifically a PROG terminal of the TP5290 battery fast-charging management chip.

Specifically, the constant current parameter setting loop 101 achieves precise control of charging current by switching and/or setting the current parameters for the constant current charging process.

An enable control loop 102 is disposed at an enable terminal of the TP5020 battery fast-charging management chip.

The enable terminal of the TP5020 battery fast-charging management chip is an EN terminal shown in FIG. 2.

Specifically, the enable control loop 102 effectively achieves activation and dormancy of the TP5020 battery fast-charging management chip.

Notably, the fast charging circuit 100 for adult toys provided in an embodiment of the present disclosure further includes a power interface configured to connect a charging cable, and the power interface may be magnetic or plug-in. The fast charging circuit 100 for adult toys provided in an embodiment of the present disclosure supports protocol-free fast charging.

To sum up, the fast charging circuit 100 for adult toys provided in an embodiment of the present disclosure offers a fast charging option for adult toys, and the present disclosure switches and/or sets the current parameters for the constant current charging process through optimization of the battery fast-charging management chip combined with the constant current parameter setting loop 101, achieves precise control of charging current, and greatly shortens the charging duration, such that the user does not need to wait for completion of an entire charging process or a long charging duration, but may charge the adult toy in fragmented time. Moreover, the enable control loop 102 enables to control activation and dormancy of the battery fast-charging management chip, and ensures the use safety and reliability of the adult toy with a fast charging function.

According to specific experimental charging tests, the TP5020 battery fast-charging management chip stably provides a maximum charging current of 2.5 A, which, in cooperation with a fast-charging battery, achieves 85%-92% of a nominal capacity through charging in 20 min, and trickle charging in a constant voltage state in 30 min. Additionally, the battery does not become very hot or swollen during charging, and fast charging brings great convenience to the user.

Moreover, adult toys have shown a development trend of diversification driven by technological iteration and consumption upgrading in recent years. In product forms, single physical stimulation tools such as basic massage wands, egg-shaped vibrators, and intelligent silicone dolls, have evolved into intelligent devices integrating technologies of biosensing, temperature control simulation, remote control, and the like. Moreover, there are various designs for products of the same type, such that users buy more and more different adult toys, and accumulate more and more charging cables adapted to them. It is found through research that users usually mix and misuse charging cables, and different charging cables vary in the quality and usage frequency, thereby resulting in different line losses. Therefore, the enable control loop in the present disclosure is arranged to quantify an acceptable range of line loss, which allows charging only through a high-quality cable with a small line resistance, and automatically excludes an inferior cable with excessive line resistance, thereby avoiding phenomena such as overheating, damage, and softening of poor-quality charging cables during charging.

A specific structure of the enable control loop 102 will be described below, and with reference to FIG. 3, optionally, the enable control loop 102 includes a first comparison input terminal 1021 and a first control strategy.

The first comparison input terminal 1021 is provided with a first comparator U1 that takes an input voltage of a VCC terminal of the battery fast-charging management chip as a reference, and a voltage reference threshold of the first comparator U1 is V1.

The first control strategy is that when VCC is greater than V1, an output of the first comparator U1 causes the enable terminal to receive a low-level input.

That is, the above control may be understood as comparing the set voltage reference threshold V1 with the input voltage of the VCC terminal of the battery fast-charging management chip connected to the first comparator U1 to achieve control of the enable terminal, and for example, when VCC is greater than V1, an output of the first comparator U1 causes the enable terminal to receive a low-level input, and the low level triggers activation of the TP5020 battery fast-charging management chip; and when VCC is less than V1, the output of the first comparator U1 causes the enable terminal to receive a high-level input, and the TP5020 battery fast-charging management chip remains in a non-activated state.

It may be understood that when VCC is greater than V1, charging is allowed; and when VCC is less than V1, the TP5020 battery fast-charging management chip is not enabled, and charging cannot be performed.

It should be noted that adult toys have shown a development trend of diversification driven by technological iteration and consumption upgrading in recent years. In product forms, single physical stimulation tools such as basic massage wands, egg-shaped vibrators, and intelligent silicone dolls, have evolved into intelligent devices integrating technologies of biosensing, temperature control simulation, remote control, and the like. Moreover, there are various designs for products of the same type, such that users buy more and more different adult toys, and accumulate more and more charging cables adapted to them. It is found through research that users usually mix and misuse charging cables, and different charging cables vary in the quality and usage frequency, thereby resulting in different line losses. Therefore, in the present disclosure, the enable control loop 102 includes the first comparison input terminal 1021 and the first control strategy; the first comparison input terminal 1021 is provided with the first comparator U1 that takes the input voltage of the VCC terminal of the battery fast-charging management chip as a reference, and the voltage reference threshold of the first comparator U1 is V1; and further, when VCC is greater than V1, an output of the first comparator U1 causes the enable terminal to receive a low-level input. In an embodiment of the present disclosure, the acceptable range of line loss is quantified based on the voltage reference threshold V1, which allows charging only through a high-quality cable with a small line resistance, and automatically excludes an inferior cable with excessive line resistance. Additionally, the voltage reference threshold V1 further establishes a minimum charging standard, which solves the problem of "large difference in charging efficiency" caused by mixed use of a plurality of charging cables to a certain extent.

Furthermore, in practical applications, an indicator light may be combined to determine whether the adult toy currently is in a charging state, and for example, when VCC is greater than V1, an output of the first comparator U1 causes the enable terminal to receive a low-level input, the low level triggers activation of the TP5020 battery fast-charging management chip, and in this case, the adult toy is in a charging state, and the indicator light flashes; when VCC is less than V1, the output of the first comparator U1 causes the enable terminal to receive a high-level input, the TP5020 battery fast-charging management chip remains in a non-activated state, and the indicator light does not flash; the user determines whether the adult toy is in the charging state according to the indicator light, when the indicator light does not flash, it indicates that the currently inserted charging cable is problematic, thereby reminding the user to switch the charging cable.

Optionally, the voltage reference threshold V1 ranges from 4.2 V to 4.5 V.

For example, the voltage reference threshold V1 may be 4.2 V, and in practical applications, when VCC is greater than 4.2 V, an output of the first comparator U1 causes the enable terminal to receive a low-level input, and the low level triggers activation of the TP5020 battery fast-charging management chip.

The voltage reference threshold V1 is set as 4.2 V to be compatible with charging cables with a line resistance≤0.4Ω

(taking a 5V charger as an example), such that more charging cables are adapted, such as some slightly aged old cables, slightly long extension cables (the line resistance increases with length) or cables with small cable diameters (a small cable diameter indicates a large resistance).

For example, the voltage reference threshold V1 may be 4.5 V, and in practical applications, when VCC is greater than 4.5 V, an output of the first comparator U1 causes the enable terminal to receive a low-level input, and the low level triggers activation of the TP5020 battery fast-charging management chip.

The voltage reference threshold V1 is set as 4.5 V, which only allows use of charging cables with a line resistance≤0.25 (2 (taking the 5V charger as an example); and higher-quality cables (cables with larger cable diameters and better materials, such as cables with pure copper cores) are adapted, and such cables have a small line loss and high conductivity and remain stable under the condition of large current.

Moreover, a 0.25Ω cable with a corresponding voltage of 4.5 V stably supports a current of 2 A, and ensures that the charging duration is strictly controlled within the expected "1 h", thereby preventing the user from missing the use opportunity.

Additionally, the voltage reference threshold V1 is raised to 4.5 V to ensure higher safety. Specifically, an adult toy is primarily in close contact with the human body during use, and the user is directly exposed to risks of cable overheating, short circuit, and the like. The low-line-loss cables screened out by raising the voltage reference threshold V1 to 4.5 V significantly reduce the risk of overheating, and insulation layers and interface processes of high-quality cables are more reliable, which minimize potential safety hazards of electric leakage and short circuit, and meet users' safety expectations for "private products".

Optionally, the first comparator U1 is a hysteresis comparator.

The voltage reference threshold V1 includes a first voltage reference threshold V11 and a second voltage reference threshold V12; and the first voltage reference threshold V11 is greater than the second voltage reference threshold V12.

The first control strategy is specifically that when VCC is greater than V11, an output of the first comparator causes the enable terminal to receive a low-level input.

It should be noted that a difference between the first voltage reference threshold V11 and the second voltage reference threshold V12 is a hysteresis voltage.

When the VCC of a traditional single-threshold comparator (for instance, only setting V1=4.5 V) approaches a threshold (such as a fluctuation between 4.48 V and 4.52 V), slight voltage fluctuations (such as a fluctuation by 0.05 V) cause frequent switching of high and low levels at the enable terminal of the TP5020 battery fast-charging management chip, and result in repeated start and stop of charging. The hysteresis comparator provided in an embodiment of the present disclosure ensures that through the "hysteresis" between the first voltage reference threshold V11 (for activation) and the second voltage reference threshold V12 (for maintenance), once charging is started, charging is stopped only when the VCC drops below the second voltage reference threshold V12, which effectively filters out fluctuation interference during charging (such as ±0.1 V fluctuation caused by contact bouncing and line voltage fluctuations).

Additionally, in special scenarios of using adult toys, movements or slight collisions of magnetic/plug-in connectors cause temporary changes in the contact resistance, and the connectors may be slightly oxidized in humid environments such as bathrooms, thereby increasing the contact resistance. The "hysteresis" design of the hysteresis comparator is particularly suitable for these scenarios: even when the VCC drops temporarily due to the above reasons (but not below the second voltage reference threshold V12), charging still continues.

Optionally, a value of the hysteresis voltage is greater than or equal to 0.1 V.

The hysteresis voltage is set to be greater than or equal to 0.1 V to effectively prevent the first comparator U1 from frequently switching output states due to voltage fluctuation near a threshold, so as to avoid problems such as prolonged charging time and battery cycling degradation caused by frequent start and stop of the charging circuit.

With reference to FIG. 4, optionally, the constant current parameter setting loop includes a resistor Rs.

The current parameters for the constant current charging process are set by setting different resistance values of the resistor Rs.

Optionally, the resistance value of the resistor Rs is any one of 0.5Ω, 0.1Ω, 0.05Ω, 0.033Ω, 0.025Ω, and 0.02Ω.

In a constant current charging stage, the voltage across the resistor Rs is 50 mV, and therefore, different current parameters for the constant current charging process are set by setting different resistance values of the resistor Rs.

Specifically, when the resistance value of the resistor Rs is 0.5Ω, a corresponding constant current charging current is 0.1 A; when the resistance value of the resistor Rs is 0.1Ω, the corresponding constant current charging current is 0.5 A; when the resistance value of the resistor Rs is 0.05Ω, the corresponding constant current charging current is 1 A; when the resistance value of the resistor Rs is 0.033Ω, the corresponding constant current charging current is 1.5 A; when the resistance value of the resistor Rs is 0.025Ω, the corresponding constant current charging current is 2 A; and when the resistance value of the resistor Rs is 0.02Ω, the corresponding constant current charging current is 2.5 A.

It should be noted that adult toys vary significantly in battery capacities and fast charging requirements (small capacities require low currents to avoid overheating, and large capacities require high currents to shorten charging time). Rs may be replaced to flexibly adapt to different batteries and fast charging requirements, and achieve product diversification.

Further, with reference to FIG. 4, each pin of the TP5020 battery fast-charging management chip will be described below.

VCC represents a positive input terminal of input voltage;

OUT represents a positive output terminal of internal voltage;

CHRG represents a charging status indicator terminal, and when the charger charges the battery, an internal switch of a CHRG pin is pulled to a low level, indicating that charging is in progress, otherwise, CHRG is in a high-impedance state;

EN represents an enable terminal of the TP5020 battery fast-charging management chip, a high level causes the TP5020 battery fast-charging management chip to be in a shutdown state, and a low level causes the TP5020 battery fast-charging management chip to be in a normal operating state;

TS represents a battery temperature detection input terminal; and

SW represents an output terminal of a built-in power switch tube, and SW specifically represents a current output terminal (i.e., a current control terminal) of the TP5020 battery fast-charging management chip.

SEN represents a positive input terminal for detecting an output charging current;

BAT represents a battery voltage detection terminal; and GND represents a ground terminal.

Optionally, an inductor L1 is disposed at the current control terminal of the TP5020 battery fast-charging management chip, and the inductor L1 is further connected to the resistor Rs.

The current control terminal of the battery fast-charging management chip is connected to the inductor L1, and both of them serve as an input terminal of the battery charging current.

Optionally, a capacitor C1 is disposed at the SEN current detection terminal of the battery fast-charging management chip.

The capacitor C1 is connected between the SEN current detection terminal of the battery fast-charging management chip and a first node. The first node is located between the inductor L1 and the resistor Rs.

In an embodiment of the present disclosure, a capacitance value of the capacitor C1 may be specifically 10 µF, which is configured to perform filtering.

Optionally, a capacitor C2 is disposed at the BAT voltage detection terminal of the battery fast-charging management chip.

The capacitor C2 is connected between the BAT voltage detection terminal of the battery fast-charging management chip and a second node.

The second node is located between the resistor Rs and a positive electrode of the rechargeable battery.

In an embodiment of the present disclosure, a capacitance value of the capacitor C2 may be specifically 10 µF, which is configured to perform filtering.

Optionally, a protection resistor R1 and a filter capacitor C3 are further disposed at the VCC terminal of the battery fast-charging management chip. High-frequency noise may be filtered out, and the supply voltage is stabilized.

Optionally, the constant current parameter setting loop 101 includes at least two sets of switchable preset parameters.

It should be noted that the constant current parameter setting loop 101 contains at least two sets of switchable preset current parameters, switching may be performed through external triggering, and the charging current is switched between preset levels (such as 1 A/2 A), thereby meeting charging requirements in different scenarios.

With reference to FIG. 5, optionally, the constant current parameter setting loop 101 is provided with a variable resistor 1011.

The current parameters for the constant current charging process are switched by switching a resistance value of the variable resistor 1011.

The variable resistor 1011 (such as a sliding rheostat, a digital potentiometer, or a resistor array) is used to replace a fixed resistor, and the constant current charging current is adjusted in real time (the current is inversely proportional to the resistance value) by changing the resistance value of the variable resistor (such as change from 0.05Ω to 0.1Ω) thereby achieving more flexible current regulation.

With reference to FIG. 6, optionally, the constant current parameter setting loop 101 further includes a second comparison input terminal 1012 and a second control strategy.

The second comparison input terminal is provided with a second comparator U2 that takes an input voltage of the VCC terminal of the battery fast-charging management chip as a reference, and a voltage reference threshold of the second comparator is V2.

The second control strategy is that when VCC is greater than V2, an output of the second comparator U2 causes the variable resistor to switch to a first resistance value, and when VCC is less than V2, an output of the second comparator U2 causes the variable resistor to switch to a second resistance value.

The first resistance value is less than the second resistance value.

Specifically, when VCC>V2 (high-quality cables with a small line loss), the variable resistor is switched to a small resistance value (fast charging with a large current).

When VCC<V2 (general cables with a large line loss), the variable resistor is switched to a large resistance value (slow charging with a small current).

That is, users usually mix and misuse charging cables, and different charging cables vary in the quality and usage frequency, thereby resulting in different line losses. Therefore, in an embodiment of the present disclosure, a method for automatically adjusting the charging current according to the cable specification to adapt to different charging cables is provided, to meet the use requirements for different charging cables.

With reference to FIG. 7, optionally, the constant current parameter setting loop 101 is further provided with an electronic switch circuit 1013.

The electronic switch circuit 1013 is disposed at an output terminal of the second comparator and configured to switch a resistance value of the variable resistor 1011.

The above electronic switch circuit 1013 may include at least one of an MOS tube, an analog switch, and a relay, or the electronic switch circuit 1013 may be composed of other elements.

Optionally, a resistance value of the first resistor is less than 0.08Ω; and a resistance value of the second resistor is greater than 0.08Ω.

Currents of fast charging and slow charging are effectively distinguished based on the resistance value of 0.08Ω.

With reference to FIG. 8, the constant current parameter setting loop 101 further includes a multi-level comparator detection module 1014.

The multi-level comparator detection module 1014 is configured to construct a dual-threshold detection so as to switch the variable resistor among three resistance values.

The multi-level comparator detection module contains dual thresholds that divide the VCC voltage into three intervals corresponding to three resistance values of the variable resistor (from small to large), thereby achieving three-level current regulation (from large to small), and more fine adaptation to cable quality.

For example, fast charging in the prior art is further divided into standard fast charging and super fast charging. The two fast charging modes also differ in charging durations, and for example, the charging duration of super fast charging is shorter than the charging duration of standard fast charging. To adapt to different fast charging standards, the multi-level comparator detection module 1014 is provided in an embodiment of the present disclosure, which achieves switching of three charging modes, adapts to more types of charging cables, and further balances charging efficiency and safety in the process of mixed use of charging cables for charging.

With reference to FIG. 9, the multi-level comparator detection module 1014 includes a third comparison input terminal 10141, a fourth comparison input terminal 10142, and a third control strategy.

The third comparison input terminal 10141 is provided with a third comparator U3 that takes an input voltage of the VCC terminal of the battery fast-charging management chip as a reference, and a voltage reference threshold of the third comparator U3 is V3.

The fourth comparison input terminal 10142 is provided with a fourth comparator U4 that takes an input voltage of the VCC terminal of the battery fast-charging management chip as a reference, and a voltage reference threshold of the fourth comparator U4 is V4.

V3 is greater than V4. For example, V3 may be set as 4.6 V, and V4 may be set as 4.3 V.

The third control strategy is that when VCC is greater than V3 and VCC is greater than V4, an output causes the variable resistor to switch to a third resistance value, when VCC is less than V3 and VCC is greater than V4, an output causes the variable resistor to switch to a fourth resistance value, and when VCC is less than V3 and VCC is less than V4, an output causes the variable resistor to switch to a fifth resistance value.

The third resistance value is less than the fourth resistance value, and the fourth resistance value is less than the fifth resistance value.

It can be seen that a specific embodiment of the multi-level comparator detection module 1014 is provided above, logical determination is performed through two comparators, and then a cable quality grade is clearly determined based on the dual thresholds, thereby ensuring that each cable operates at the "most efficient and safe" current level.

Through the above method, the present disclosure is adapted to diversified scenarios of charging an adult toy (with an original charging cable for household use, a charging cable temporarily borrowed when going out, a super fast charging cable, or the like), which avoids fluctuations in charging experience caused by differences in cable quality, and improves product reliability.

Other structures of the TP5020 battery fast-charging management chip in the embodiments of the present disclosure will be described below, and with reference to FIG. 10, the CHRG terminal represents a charging status indicator terminal. CHRG represents the charging status indicator terminal, and when the charger charges the battery, an internal switch of a CHRG pin is pulled to a low level, indicating that charging is in progress, and in this case, an LED D1 lights up. Otherwise, CHRG is in the high-impedance state.

OUT represents the positive output terminal of internal voltage that is externally connected to a capacitor C4.

A capacitance value of the capacitor C4 may be specifically 10 μF for use in the charging circuit.

Based on the same inventive concept, an adult toy is further provided in an embodiment of the present disclosure. The adult toy is provided with the fast charging circuit for adult toys described in the foregoing embodiments.

Optionally, the adult toy further includes at least one charging cable for fast charging.

The above adult toy may specifically be: an insertable vibration device, a simulative massage device, a vibrating wand, an egg-shaped vibrator, a masturbation cup, a vibrating ring, or the like.

Moreover, in the description of the specification and the appended claims of the present disclosure, the terms "first", "second", "third", and the like are used merely to distinguish between descriptions and may not be construed as indication or implication of relative importance.

In the present specification, the description of reference terms such as "one embodiment" and "some embodiments" means that specific features, structures or characteristics described in combination with this embodiment are included in one or more embodiments of the present disclosure. Therefore, the statements appearing in different parts of the present specification, such as "in one embodiment", "in some embodiments", "in other embodiments", "in some other embodiments", and the like, do not necessarily refer to the same embodiment, but mean "one or more, but not all embodiments", unless otherwise specifically emphasized in any other way. The terms "including", "containing", "having" and any variations thereof mean "including but not limited to", unless otherwise specifically emphasized in any other way.

In the description of the embodiments of the present disclosure, it should be understood that the terms "upper", "lower", "front", "rear", "left", "right", "vertical", "horizontal", "central", "top", "bottom", "top portion", "bottom portion", "inner", "outer", "inside", "outside", and other indicated orientations or positional relationships are based on orientation or position relations shown in the accompanying drawings.

In the description of the embodiments of the present disclosure, it should be noted that, unless otherwise explicitly specified and defined, the terms "mounting", "connecting", "connection", and "assembly" should be understood in a broad sense, for example, they may be a fixed connection, a detachable connection, or an integrated connection; and may be a direct connection, or an indirect connection via an intermediate medium, or communication inside two elements. For those of ordinarily skilled in the art, specific meanings of the above terms in the present disclosure could be understood according to specific circumstances.

In the description of the embodiments of the present disclosure, specific feature, structure, material or characteristics described may be combined in a suitable manner in any one or more embodiments or examples.

In the description of the embodiments of the present disclosure, it should be understood that that "-" and "~" represent the same range of two numerical values, and the range includes end values thereof, for example, "A-B" means a range greater than or equaling to A and less than or equaling to B. "A~B" means a range greater than or equaling to A and less than or equaling to B.

In the description of the embodiments of the present disclosure, the term "and/or" represents merely an association relationship describing associated objects, indicating that there may be three types of relationships, for example, A and/or B, which means three types of situations, that is, the existence of A alone, the existence of both A and B, and the existence of B alone. In addition, the character "/" herein generally indicates that the associated objects are in an "or" relationship.

Although the embodiments of the present disclosure have been illustrated and described, it should be understood that those of ordinary skill in the art may make various changes, modifications, replacements and variations to the above embodiments without departing from the principle and spirit of the present disclosure, and the scope of the present disclosure is limited by the appended claims and their legal equivalents.

What is claimed is:

1. A fast charging circuit for adult toys, comprising a charging control unit, wherein the charging control unit is configured to perform charging control of a rechargeable battery with a charging rate of not less than 1 C;

the charging control unit employs a battery fast-charging management chip;

a constant current parameter setting loop is disposed at a current control terminal of the battery fast-charging management chip and configured to switch and/or set current parameters for a constant current charging process; wherein the constant current parameter setting loop includes a variable resistor and a multi-level comparator detection module including a first comparison input terminal, a second comparison input terminal, and a first control strategy, wherein the first comparison input terminal is provided with a first comparator that compares an input voltage of a VCC terminal of the battery fast-charging management chip with a voltage reference threshold V3;

the second comparison input terminal is provided with a second comparator that compares the input voltage of the VCC terminal of the battery fast-charging management chip with a voltage reference threshold V4, wherein V3 is greater than V4;

the first control strategy is that:

when VCC is greater than V3 and VCC is greater than V4, a comparison output causes the variable resistor to switch to a first resistance value, when VCC is less than V3 and VCC is greater than V4, the comparison output causes the variable resistor to switch to a second resistance value, and when VCC is less than V3 and VCC is less than V4, the comparison output causes the variable resistor to switch to a third resistance value, wherein the first resistance value is less than the second resistance value, and the second resistance value is less than the third resistance value; and an enable control loop is disposed at an enable terminal of the battery fast-charging management chip.

2. The fast charging circuit for adult toys according to claim 1, wherein the constant current parameter setting loop comprises at least two sets of switchable preset parameters.

3. The fast charging circuit for adult toys according to claim 1, wherein the constant current parameter setting loop is further provided with an electronic switch circuit; and the electronic switch circuit is configured to switch a resistance value of the variable resistor.

4. The fast charging circuit for adult toys according to claim 1, wherein the constant current parameter setting loop comprises a resistor Rs; and the current parameters for the constant current charging process are set by setting different resistance values of the resistor Rs.

5. The fast charging circuit for adult toys according to claim 4, wherein the resistance value of the resistor Rs is any one of 0.5Ω, 0.1Ω, 0.05Ω, 0.033Ω, 0.025Ω, and 0.02Ω.

6. The fast charging circuit for adult toys according to claim 4, wherein an inductor L1 is disposed at the current control terminal of the battery fast-charging management chip, and the inductor L1 is further connected to the resistor Rs.

7. The fast charging circuit for adult toys according to claim 6, wherein a capacitor C1 is disposed at a current detection terminal of the battery fast-charging management chip;

the capacitor C1 is connected between the current detection terminal of the battery fast-charging management chip and a first node; and the first node is located between the inductor L1 and the resistor Rs.

8. The fast charging circuit for adult toys according to claim 6, wherein a capacitor C2 is disposed at a voltage detection terminal of the battery fast-charging management chip;

the capacitor C2 is connected between the voltage detection terminal of the battery fast-charging management chip and a second node; and the second node is located between the resistor Rs and a positive electrode of the rechargeable battery.

9. The fast charging circuit for adult toys according to claim 1, wherein a protection resistor and a filter capacitor are further disposed at the VCC terminal of the battery fast-charging management chip.

10. An adult toy, comprising the fast charging circuit for adult toys according to claim 1.

11. The adult toy according to claim 10, wherein the adult toy further comprises at least one charging cable for fast charging.

12. The fast charging circuit for adult toys according to claim 1, wherein the enable control loop comprises a third comparison input terminal and a second control strategy, wherein the third comparison input terminal is provided with a third comparator that compares the input voltage of the VCC terminal of the battery fast-charging management chip with a voltage reference threshold V1; and the second control strategy is that when VCC is greater than V1, an output of the third comparator causes the enable terminal to trigger activation of the battery fast-charging management chip.

13. The fast charging circuit for adult toys according to claim 12, wherein the voltage reference threshold V1 ranges from 4.2 V to 4.5 V.

14. The fast charging circuit for adult toys according to claim 12, wherein the third comparator is a hysteresis comparator;

the voltage reference threshold V1 comprises a first voltage reference threshold V11 and a second voltage reference threshold V12; and the first voltage reference threshold V11 is greater than the second voltage reference threshold V12; and the second control strategy is that when VCC is greater than V11, the output of the third comparator causes the enable terminal to trigger activation of the battery fast-charging management chip.

15. The fast charging circuit for adult toys according to claim 14, wherein a difference between the first voltage reference threshold V11 and the second voltage reference threshold V12 is a hysteresis voltage; and a value of the hysteresis voltage is greater than or equal to 0.1 V.

* * * * *